United States Patent Office 2,758,924
Patented Aug. 14, 1956

2,758,924

STABILIZED VITAMIN PREPARATIONS

Richard D. Wakely, Chicago, Ill., assignor to Peter Hand Brewery Company, Chicago, Ill., a corporation of Illinois No Drawing. Application March 4, 1953, Serial No. 340,407

22 Claims. (Cl. 99—11)

This invention relates to preparations containing vitamin A activity and to methods for the production thereof.

Because of the known susceptibility of vitamin A to deterioration, the problem of effectively stabilizing this important vitamin has occupied workers in this field for many years. The problem has been aggravated by the fact that vitamin A—whether natural or synthetic and whether in the form of the alcohol or ester—is particularly sensitive to and destroyed by long storage, contact with air and light, elevated temperatures, and especially by contact with mineral matter.

Some success in stabilizing vitamin A preperations has been achieved heretofore by the use of such expedients as adding antioxidants of one kind or another to the vitamin product, or by covering vitamin particles with various portective coatings. However, even the best of such "stabilized" preparations are only partially satisfactory; besides the relatively low degree of protection against deterioration imparted to vitamin A products by means of such expedients as have been used, it has been found that in many cases the protective coatings used may interfere with the proper utilization of such oil soluble vitamins by the animal body.

In order to increase the utilization of these vitamin preparations by the animal body it has been suggested to suspend oil soluble vitamins in dispersing agents or to produce them in the form of water soluble esters. While in some instances the water solubility of the preparation has thereby been improved, the latter advantage has not been accompanied by enhancement of stability.

Accordingly, it is an important object of this invention to provide from highly labile vitamin A active compounds, compounds having a high degree of stability.

A further object is to provide a stable vitamin preparation whose potency is not lost when the preparation is subjected to the normally destructive influences of other materials, or adverse processing conditions or long storage either alone or in admixture with animal and human foods.

A further object is to provide a stable and water soluble source of such vitamins.

A further object is to provide a vitamin preparation characterized by having an enhanced degree of utilization by the animal body.

A further object is to provide a dry stable crystalline source of vitamin A active preparations requiring no special precautions in handling, processing, mixing and storage.

A further object is to provide food compositions whose vitamin A activity remains stable over long periods of time and under adverse conditions.

A further object of this invention is to produce a vitamin A active material which possesses both true water solubility and stability.

In accordance with my invention I have found that by reacting vitamin A or its esters, either derived from natural or synthetic sources, with certain bile acids namely those having a hydroxy group specifically in the 3 and 12 positions, such as desoxycholic or apocholic acids, that a crystalline product is formed which has vitamin activity equivalent to the amount of vitamin reacted, resulting in a complete recovery of the vitamin A.

My preparation has remarkable stability in the presence of minerals, oxidizing agents, light, air, and heat, and has been found to have an enhanced utilization by animals.

The novel composition of this invention may be prepared by mixing vitamin A or esters of vitamin A with the bile acid in a suitable solvent, and forcing a precipitation by adding water, acidulated water or salt water thereto. The composition may likewise be prepared by evaporating the solvent mixture.

The following examples will illustrate my invention in further detail. It is to be understood of course that these examples are illustrative only and are not to be construed in a limiting sense.

EXAMPLE I

To a non-actinic Erlenmeyer flask containing 0.301 gram of vitamin A alcohol and 6 ml. of anhydrous methanol were added 2.650 grams of desoxycholic acid and 7 ml. of warm methanol. This represents a molecular ratio of approximately one mol vitamin A alcohol to five of desoxycholic acid. Using ground glass connections, the methanol was removed by evacuation in a water bath.

The product obtained was of a pale yellow crystalline nature and was rendered water soluble upon addition of 0.5 N sodium hydroxide solution.

The thaw point of the product, which appears to be a vitamin A alcohol-desoxycholic acid complex was 152.5–153.5° C. The melting point was 158–159° C.

"Thaw point" as used herein means that temperature or range of temperatures at which the crystalline material appears to sweat by exhibiting small droplets and developing a distinctly yellow color. "Melting point" means the temperature or range at which the liquid loses the final traces of turbidity.

EXAMPLE II

*Preparation of vitamin A acetate-desoxycholic acid complex*

To a non-actinic Erlenmeyer flask containing 0.692 gram of vitamin A acetate in 8 ml. of anhydrous methanol were added 4.1635 grams of desoxycholic acid in 10 ml. of warm methanol. Using ground glass connections the methanol was removed by evacuation from a water bath. The product obtained was of a pale yellow crystalline nature and was rendered water soluble upon addition of dilute sodium hydroxide solution. The thaw point was 155–165° C. and the melting point 160–161° C.

EXAMPLE III

*Preparation of vitamin A palmitate-desoxycholic complex*

3 ml. of a chloroform solution of vitamin A palmitate (synthetic) containing 0.2081 gram of vitamin A palmitate were admixed with 2.0392 grams of desoxycholic acid in 9 ml. of methanol (anhydrous). The solvent was then removed by heating on a water bath with the aid of vacuum. There was obtained a pale yellow crystalline material. Herein the ratio of the vitamin A palmitate to desoxycholic acid was one to thirteen. The product was soluble in dilute sodium hydroxide solution.

EXAMPLE IV

*Preparation of natural vitamin A ester-desoxycholic acid complex*

3.5825 grams of desoxycholic acid in 12 ml. of anhydrous methanol was added to 0.3668 gram of natural vitamin A ester dissolved in 3 ml. of chloroform. The solvent was removed by heating on a water bath with the aid of vacuum and there was obtained a pale yellow crystalline material soluble in dilute NaOH.

Other solvents besides methanol can of course be used in preparing the vitamin complexes of this invention, providing such solvents or solvent mixtures have a mutual affinity for the vitamin A alcohol or ester and the bile acid. Thus ethanol and acetone are examples of such solvents, and chloroform and methanol examples of such solvent mixtures.

Besides the specific methods described above, my novel preparations can be produced, for example, by adding water to a solution of vitamin A alcohol or ester and the bile acid; or by acidifying a solution of vitamin A ester and the bile acid; or by adding salt water to a solution of vitamin A ester and the bile acid.

It is well known that destruction of vitamin A is catalyzed by the presence of minerals. In Table I below there is shown the results of tests illustrating the stability in the presence of a commercial swine mineral blend of the crystalline products prepared as described in Examples I, II and III above, in comparison with the best commercially available vitamin A preparation on the market. These tests were conducted at 45° C. and 100% relative humidity.

The swine mineral blend contained regular untreated animal feed grade defluorinated phosphate, dicalcium phosphate, potassium iodide, manganese sulfate, iron sulfate, copper carbonate and cobalt sulfate. Analysis was: Iodine .035%; manganese 1.10%; iron .90%; copper .07%; cobalt .022%; calcium 26%.

In the following tests, shown in Table I and Table II sufficient material being tested was added to and mixed with the mineral mixture in quantity sufficient to provide 5000 U. S. P. units of vitamin A activity per gram, in the final mixture.

TABLE I

| Material on Test | Percent Retention of Vitamin A Activity | | |
| --- | --- | --- | --- |
| | 16 Days | 23 Days | 34 Days |
| Vitamin A Alcohol Desoxycholic Acid Product | 98 | 100 | 98 |
| Vitamin A Acetate Desoxycholic Acid Product | 103 | 103 | 101 |
| Vitamin A Palmitate Desoxycholic Acid Product | 93 | 95 | 95 |
| A commercial product consisting of fish liver oil on soy flour and microcrystalline wax | 75 | 53 | 18 |
| A commercial product consisting of vitamin A acetate in gelatin | 48 | 28 | 6 |
| A commercial preparation consisting of fish liver oil with added lecithin and tocopherols on wheat middlings | 0 | | |

Because of the sensitivity of vitamin A products to oxidation, a rigorous test of the stability of such products is one in which the vitamin A products are stored at elevated temperatures, in a base containing oxidizing materials. Such a test was conducted in a base of dextrose containing 10% $K_2Cr_2O_7$ and using one of the products of this invention as well as several commercially available vitamin A preparations. These tests were conducted at 45° C. Results of the tests are shown in Table II below:

TABLE II

| Material on Test | Percent Retention of Vitamin A Activity | | | |
| --- | --- | --- | --- | --- |
| | 40 Hrs. | 55 Hrs. | 92 Hrs. | 107 Hrs. |
| Vitamin A Acetate-Desoxycholic Acid Product | 97.7 | | 89.3 | 81.0 |
| A product consisting of fish liver oil, lecithin and tocopherols on soy flour | 76.0 | | 33.6 | 14.5 |
| Commercial Vitamin A fish liver oil (100,000 U. S. P./gm.) | 50.6 | 28.8 | 0 | |
| U. S. P. Reference Vitamin A oil | 41.5 | 0 | | |

In running the above tests samples were removed periodically and the vitamin A potency determined by a standard colorimetric procedure. As can be seen from the above table one of the products of this invention, namely the complex formed from vitamin A acetate and desoxycholic acid was tremendously superior to three representative commercial products.

Since animal feeds are normally fortified with vitamin products they provide an excellent base in which to test the stability of vitamin A preparations and particularly since such feeds contain numerous materials which promote destruction of the vitamin activity. Such a test was conducted at 45° C. using the products prepared in accordance with the present invention as well as several of the most stable commercial vitamin A preparations available on the current market, added to a typical commercial 20% broiler mash (in sufficient quantity to provide 500 U. S. P. units of vitamin A activity per gram of mash). Results of the test are shown in the following table below.

TABLE III

| Materials on Test | Percent Retention of Vitamin A Activity | | | | |
| --- | --- | --- | --- | --- | --- |
| | 1 Week | 2½ Wks. | 4½ Wks. | 6 Wks. | 9½ Wks. |
| Vitamin A alcohol Desoxycholic Acid Product | 94.7 | 95.1 | 92.8 | 93.5 | 91.0 |
| Vitamin A Acetate Desoxycholic Acid Product | 100.0 | 96.0 | 97.0 | 91.0 | 89.5 |
| Vitamin A palmitate Desoxycholic Acid Product | 98.2 | 94.2 | 88.4 | 87.0 | 85.5 |
| A product consisting of fish oil on soy flour coated with microcrystalline wax | 101.0 | 93.1 | 87.0 | 78.2 | 56.4 |
| Commercial fish liver oil (100,000 U. S. P./gm.) | 80.0 | 67.3 | 47.5 | 12.2 | 0 |
| Commercial "Stabilized" fish liver oil | 85.7 | 71.0 | 51.0 | 14.8 | 0 |

The products of this invention may likewise be used to advantage in producing processed food products for example, bread. The stability of the present products, which stability is maintained throughout the mixing, baking and crumbing of bread is illustrated by the following data:

TABLE IV

| Material on test | Percent retention of vitamin A activity |
| --- | --- |
| A Vitamin Acetate Desoxycholic Acid Product | 102.2 |
| A wax-coated vitamin A preparation recommended by the manufacturer to the baking industry | 70.5 |

In the above test the vitamin A product was incorporated with the other ingredients used in making the dough. The dough was handled and baked under commercial conditions. The bread was subsequently dried, crumbed, and its vitamin A activity determined and the retention thereof calculated, with the above results.

To illustrate the stability of the product of this invention during the processing of milk, a sample of whole milk was fortified with 10 units per ml. of either the vitamin A acetate desoxycholic acid preparation of this invention or with U. S. P. reference vitamin A oil, after which the samples were subjected to a temperature of 140° F. for two hours, cooled to room temperature and refrigerated overnight. The samples were again brought to room temperature and agitated constantly for four hours prior to analysis. On analysis the following results were obtained.

TABLE V

| Material on test | Percent retention of vitamin A activity |
| --- | --- |
| Vitamin A Acetate-Desoxycholic Acid Product | 97.8 |
| U. S. P. Reference Vitamin A Oil | 40.0 |

In order to determine whether the tremendously increased stability of my new preparations had been achieved at a loss of their vitamin availability to the animal body, a comparison of the biological utilization of the product of this invention as against U. S. P. vitamin A reference oil was made as follows: 6 pens of 25, one day old White Rock chicks were fed a basal ration containing no vitamin A activity for two weeks. At the end of this time the chicks were provided with three graded levels of vitamin A in the form of vitamin A acetate desoxycholic acid complex and similar levels in the form of U. S. P. reference vitamin A oil. The amounts used are considered suboptimum for maximum growth. The vitamin A acetate desoxycholic acid preparation showed better utilization of vitamin A as judged by chick growth at the end of four weeks. This is indicated by the fact that with increasing levels of vitamin A in the feed, there was increased response from the vitamin A acetate-desoxycholic acid complex greater than the response of the chicks to the U. S. P. reference vitamin A oil; that is to say a greater slope of the growth curve was obtained when desoxycholic acid vitamin A acetate complex was fed, as shown in the following table:

TABLE VI

| U. S. P. Units of Vitamin A Per Pound of Feed | Weight in Grams at End of 4 Weeks | |
|---|---|---|
| | My Invention | U. S. P. Reference Oil |
| 300 | 322 | 315 |
| 600 | 345 | 329 |
| 900 | 368 | 350 |

In another series of tests, young male rats which had been depleted of their liver stored vitamin A, were fed graded levels of either the vitamin A acetate-desoxycholic acid preparation hereinbefore described or U. S. P. reference vitamin A oil. A negative control group receiving only vitamin A free basal (U. S. P. XIV) was also included in the test.

After a three day high level dosage, the rats were sacrificed and the amount of vitamin A stored in the livers determined by well known procedures.

As indicated in Table VII below, the number of U. S. P. units of vitamin A stored in the livers of the rats fed my preparation were greater than the number of units stored in the livers of rats fed equal doses of U. S. P. reference vitamin A oil. Moreover, I have found that this effect increases with increasing dosages. This is indicative of the enhancement of the utilization of vitamin A when supplied in the form of my invention.

These results are illustrated in Table VII below:

TABLE VII

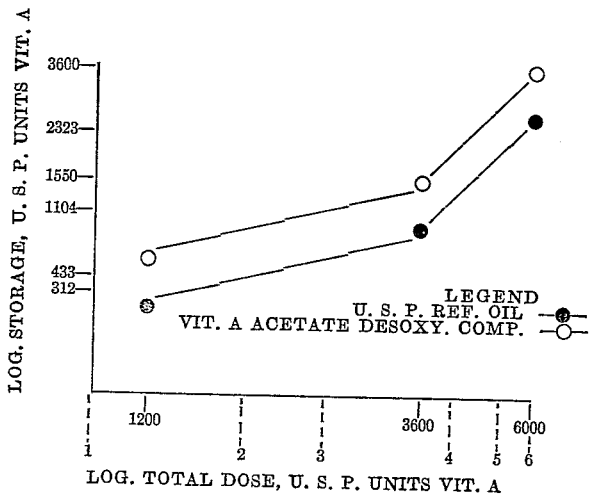

The following test results show the tremendous stability of the products of my invention against the destruction of vitamin A activity during mixing and grinding, which operations are normally extremely destructive of vitamin A.

0.3905 gram of vitamin A acetate-desoxycholic acid complex prepared in accordance with the foregoing examples was added to 30.5185 grams of swine mineral blend (having the composition hereinbefore described) and the mixture ground through an eighty mesh screen. This process was repeated twice and the resulting homogeneous mixture stored in a loosely stoppered bottle over night at room temperature. Vitamin A was determined colorimetrically the following day.

The potency of the vitamin A acetate desoxycholic acid preparation was 407,000 U. S. P. units per gram. The calculated potency of the mineral-vitamin mixture was $$\frac{407,000 \times 0.3905}{30.9090} = 5,140 \text{ U. S. P. units per gram}$$

The actual potency of the mineral-mixture by colorimetric determination was 5,160 U. S. P. units per gram. The per cent retention was therefore 100.3%.

Similarly a vitamin A acetate-apocholic acid complex was prepared and tested as follows:

To 0.7320 gram of vitamin A acetate dissolved in 10 ml. of anhydrous methanol was added a solution 4.7910 g. of apocholic acid in 20 ml. of anhydrous methanol, this representing an approximate ratio of five moles of apocholic acid per mole of vitamin A acetate. The methanol was then removed by means of vacuum, on a water bath. The resulting pale yellow crystalline product was powdered, and 0.3231 g. of this powder admixed with a swine mineral blend, having the composition hereinbefore described, so that the resulting mixture contained 3,620 U. S. P. units of vitamin A per gram.

This mixture was double ground through an 80 mesh screen and stored for 24 hours in an open jar at 45° C. The vitamin A potency of the mixture was then determined and found to be 3,173 U. S. P. units per gram.

This represents a retention of 87.8% of the vitamin A potency. No vitamin A preparations other than those of this invention will withstand such drastic treatment as is represented by the conditions of the above treatment.

It will be of course obvious that the compositions of my invention may be used to supplement or to fortify food products such as milk and milk products, canned fruits, vegetables, meats, foods, bakery products, spreads, such as butter, margarine and peanut butter and the like. They are likewise useful in the fortification of animal feeds and animal feeds supplements, as well as in pharmaceutical preparations containing vitamins in liquid or dry form.

The compositions of the present invention are not simple mixtures but appear to be the result of a chemical union.

Illustrative of this is my observation that, while in mechanical mixtures of desoxycholic acid or apocholic acid and vitamin A, the vitamin A activity is rapidly destroyed, the vitamin A activity of the products of this invention remain constant, under the same conditions. It is also to be noted that, as hereinbefore pointed out my compositions have a definite ratio of bile acid to the vitamin A component thereof. While the ratios may vary depending, for example, on such factors as the particular bile acid used, whether the vitamin component is in the form of ester or alcohol, and whether the complex is formed from one solvent or another or by one method or another, the fact remains that under any set of conditions and with given reactants, the resulting complex will have a particular maximum ratio of bile acid to vitamin, and any vitamin in excess of this is rapidly destroyed.

The products of this invention include soluble salts such as sodium and potassium salts of the vitamin A-bile, acid complexes, above described, as well as other alkaline earth and alkali metal salts thereof, and these are likewise comprehended by my invention.

While this invention is described in terms of particular ingredients, and amounts thereof to be used, it is obvious that modifications and variations thereof may be made without departing from the spirit and scope of the invention and only such limitations should be imposed as are indicated by the appended claims.

I claim:

1. A stable vitamin A preparation comprising the reaction product of (a) a material selected from the group consisting of vitamin A and derivatives of vitamin A and (b) a member of the group consisting of desoxycholic acid and apocholic acid.

2. A stable, vitamin enriched food supplement comprising dietary minerals, and a material high in vitamin A potency said material comprising the reaction product of (a) a member of the group consisting of vitamin A and vitamin A esters and (b) desoxycholic acid.

3. A processed food product enriched with a material high in vitamin A potency and characterized by the high stability of the vitamin A potency therein comprising a food to which has been added prior to processing thereof, a product comprising the reaction product of a member of the group consisting of vitamin A and vitamin A esters and desoxycholic acid.

4. A method of producing an animal feed having high vitamin A stability which comprises incorporating in animal feed a product formed by reacting a member of the group consisting of vitamin A and esters of vitamin A with desoxycholic acid.

5. A method of producing a product having a vitamin A potency and improved resistance to deterioration of such potency which comprises dissolving a member of the group consisting of vitamin A and esters of vitamin A, and desoxycholic acid in a common solvent therefore, and then removing the solvent therefrom.

6. A composition having vitamin A potency in a highly stable form comprising a reaction product of desoxycholic acid with a member of the group consisting of vitamin A, vitamin A esters and mixtures thereof.

7. A composition having a highly stable vitamin A potency comprising a reaction product of vitamin A alcohol and desoxycholic acid said reaction product having a molecular ratio of approximately 1 mole of vitamin A alcohol to 5 moles of desoxycholic acid, a thaw point of 152.5–153.5° C., and a melting point of 158–159° C.

8. A composition having a highly stable vitamin A potency comprising a reaction product of vitamin A acetate and desoxycholic acid said reaction product having a molecular ratio of about 1 mole of vitamin A acetate to 5 moles of desoxycholic acid, a thaw point of 155–165° C. and a melting point of 160–161° C.

9. A composition having a highly stable vitamin A potency comprising a reaction product of vitamin A palmitate and desoxycholic acid said reaction product having a molecular ratio of approximately 1 mole of vitamin 9 palmitate and 13 moles of desoxycholic acid.

10. A composition having a highly stable vitamin A potency comprising a reaction product of vitamin A in natural ester form and desoxycholic acid said reaction product having a molecular ratio of approximately 1 mole of said ester and 13 moles of desoxycholic acid.

11. The composition of claim 10 wherein the vitamin is a member of the group consisting of vitamin A alcohol, a vitamin A ester and mixtures thereof.

12. A composition having a highly stable vitamin A potency comprising a reaction product of vitamin A acetate and apocholic acid said reaction product having a molecular ratio of approximately 1 mole of vitamin A acetate to 5 moles of apocholic acid.

13. A stable vitamin-enriched food supplement comprising dietary minerals in admixture with the product of claim 7.

14. A stable vitamin-enriched food supplement comprising dietary minerals in admixture with the product of claim 8.

15. A stable vitamin-enriched food supplement comprising dietary minerals in admixture with the product of claim 9.

16. A stable vitamin-enriched food supplement comprising dietary minerals in admixture with the product of claim 10.

17. A stable vitamin-enriched food supplement comprising dietary minerals in admixture with the product of claim 12.

18. A processed food product enriched with a material high in vitamin A potency and characterized by the high stability of the vitamin A potency therein comprising a food to which has been added prior to processing thereof, the product of claim 7.

19. A processed food product enriched with a material high in vitamin A potency and characterized by the high stability of the vitamin A potency therein comprising a food to which has been added prior to processing thereof, the product of claim 8.

20. A processed food product enriched with a material high in vitamin A potency and characterized by the high stability of the vitamin A potency therein comprising a food to which has been added prior to processing thereof, the product of claim 9.

21. A processed food product enriched with a material high in vitamin A potency and characterized by the high stability of the vitamin A potency therein comprising a food to which has been added prior to processing thereof, the product of claim 10.

22. A processed food product enriched with a material high in vitamin A potency and characterized by the high stability of the vitamin A potency therein comprising a food to which has been added prior to processing thereof, the product of claim 12.

References Cited in the file of this patent

UNITED STATES PATENTS

| | | |
|---|---|---|
| 2,205,925 | Hickman | June 25, 1940 |
| 2,311,517 | Buxton et al. | Feb. 16, 1943 |

OTHER REFERENCES

Chem. Abs., 23 (1929), 3490 [5].
Chem. Abs., 31 (1937), 8614 [3].
"Anales de la Asociacion de Quimica y Farmacia del Uruguay," Tomo 50, 1948 (publicado en Julio), page 16.